(12) United States Patent
Mimar

(10) Patent No.: US 6,963,341 B1
(45) Date of Patent: Nov. 8, 2005

(54) FAST AND FLEXIBLE SCAN CONVERSION AND MATRIX TRANSPOSE IN A SIMD PROCESSOR

(75) Inventor: Tibet Mimar, 1040 Gloucester Ct., Sunnyvale, CA (US) 94087

(73) Assignee: Tibet Mimar, Morgan Hill, CA (US)

( * ) Notice: Subject to any disclaimer, the term of this patent is extended or adjusted under 35 U.S.C. 154(b) by 133 days.

(21) Appl. No.: 10/441,628

(22) Filed: May 20, 2003

Related U.S. Application Data

(60) Provisional application No. 60/385,648, filed on Jun. 3, 2002.

(51) Int. Cl.[7] .......................... G06F 15/80; G06F 15/00
(52) U.S. Cl. .......................... 345/505; 345/505; 712/2; 712/3; 712/4; 712/5; 712/6; 712/7; 712/8; 712/9
(58) Field of Search .................... 345/505; 712/2–9

(56) References Cited

U.S. PATENT DOCUMENTS

| | | | |
|---|---|---|---|
| 5,420,809 A * | 5/1995 | Read et al. | |
| 5,973,705 A * | 10/1999 | Narayanaswami | |
| 2002/0027552 A1 * | 3/2002 | Lee | 345/421 |
| 2002/0035678 A1 * | 3/2002 | Rice et al. | 712/223 |

OTHER PUBLICATIONS

Shah, V. Polygon scan conversion—Linear Approach. Georgia Tech. http://www.cc.gateach.edu/gvu/multimedia/nsfm-media/graphics/elabor/polyscan/polyscan1.html.*

* cited by examiner

*Primary Examiner*—Kee M. Tung
*Assistant Examiner*—Joni Hsu

(57) ABSTRACT

The present invention provides efficient ways to implement scan conversion and matrix transpose operations using vector multiplex operations in a SIMD processor. The present method provides a very fast and flexible way to implement different scan conversions, such as zigzag conversion, and matrix transpose for 2×2, 4×4, 8×8 blocks commonly used by all video compression and decompression algorithms.

9 Claims, 4 Drawing Sheets

Circuit for Vector Multiplexing Instruction.

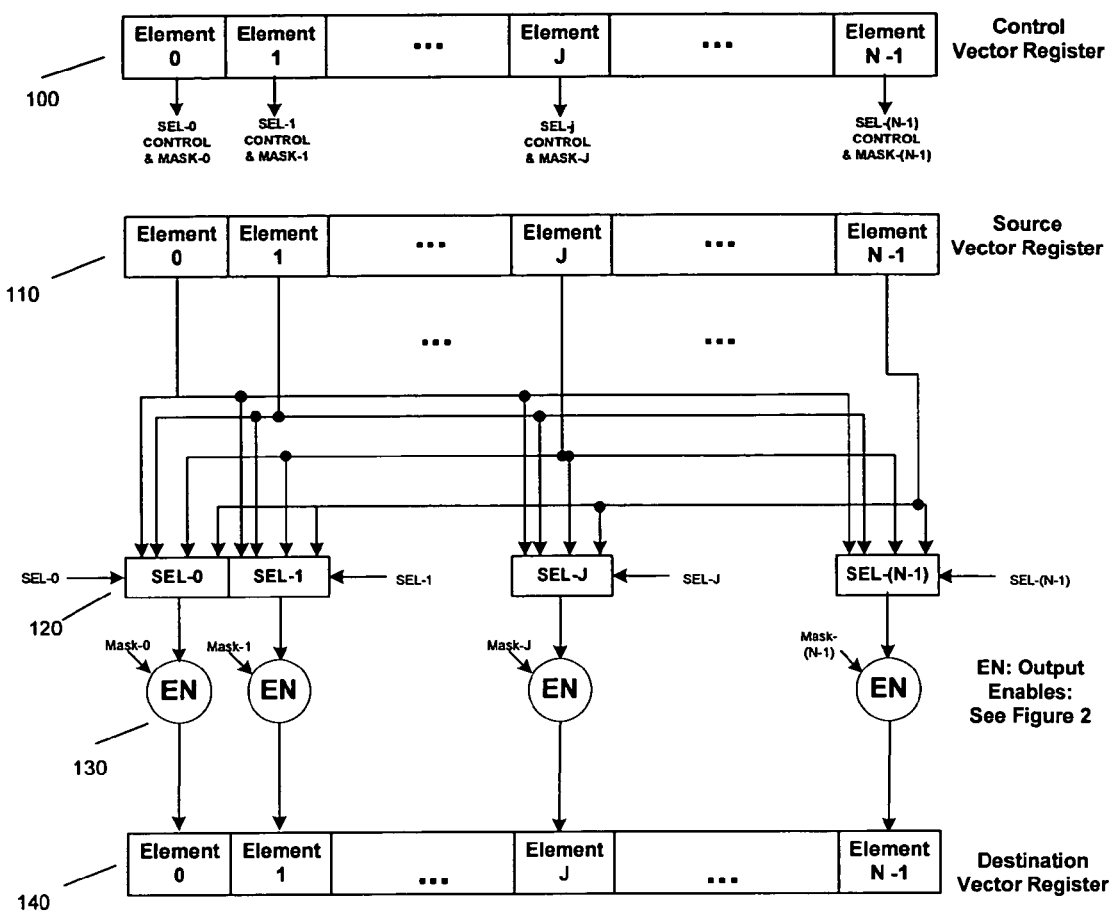
Figure 1. Circuit for Vector Multiplexing Instruction.

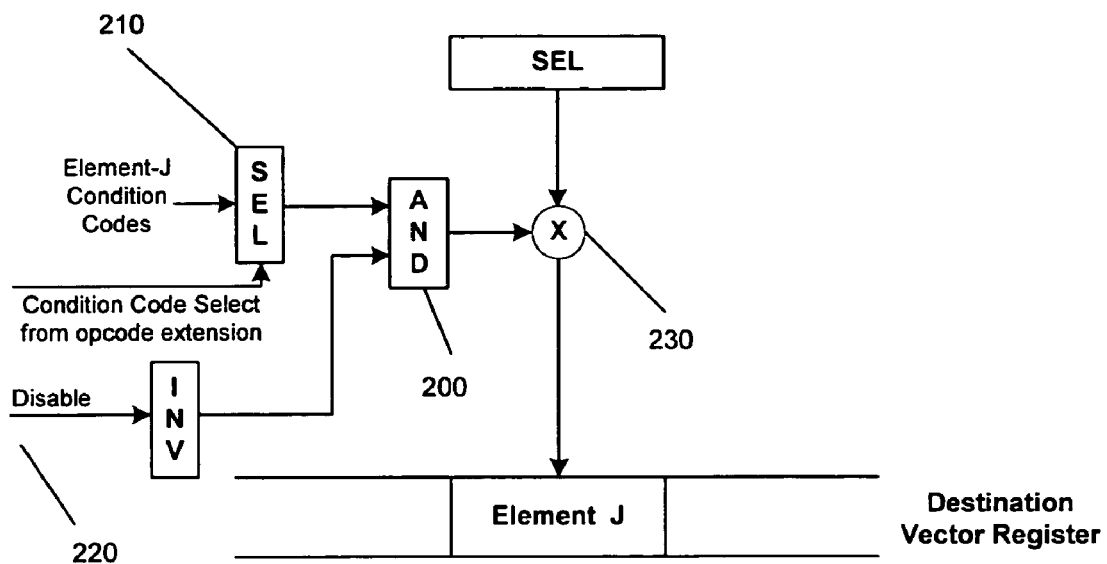
Figure 2. Circuit for Output Element Enable.

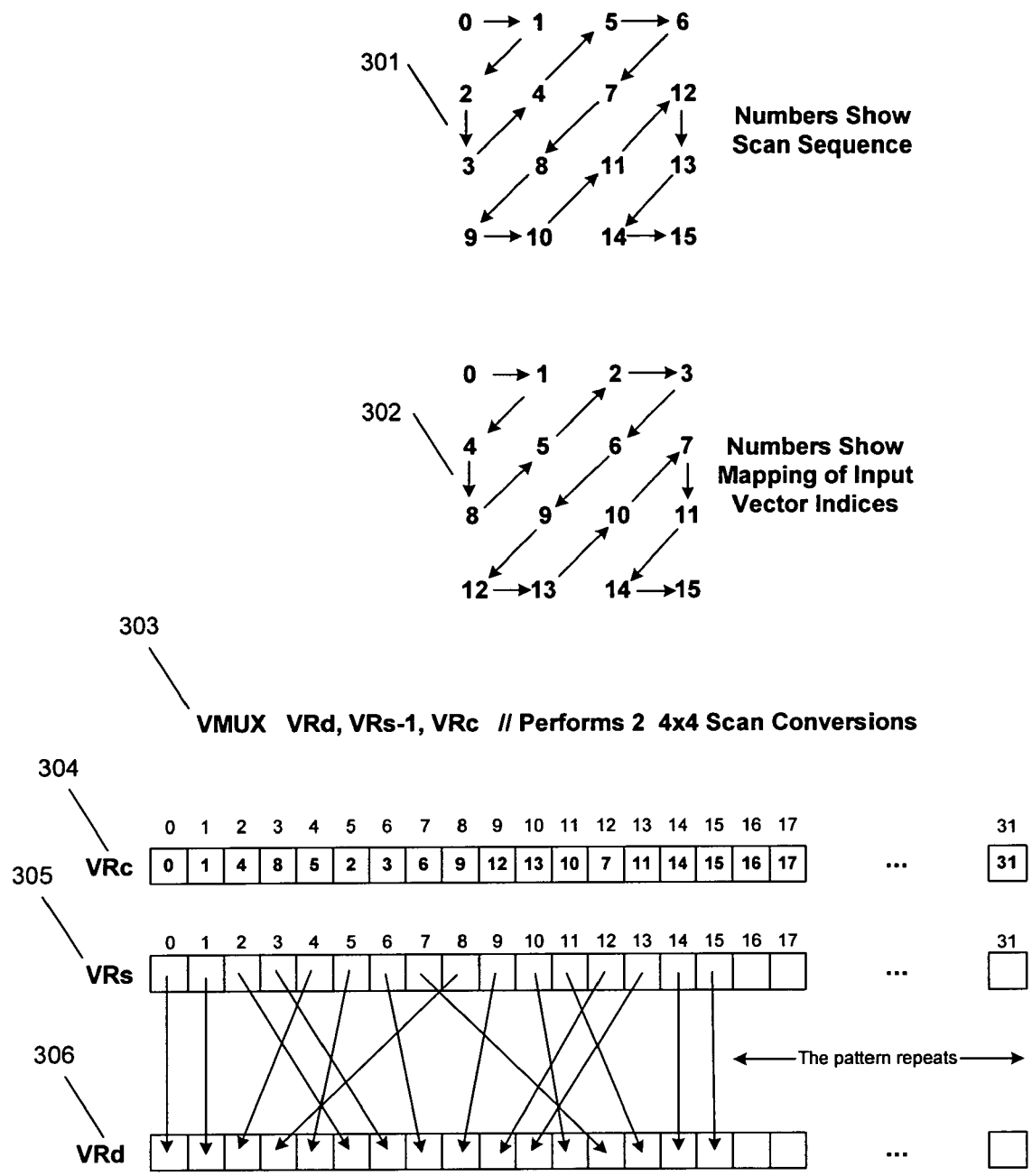
Figure 3. 4x4 Matrix Scan Zigzag Conversion Example.

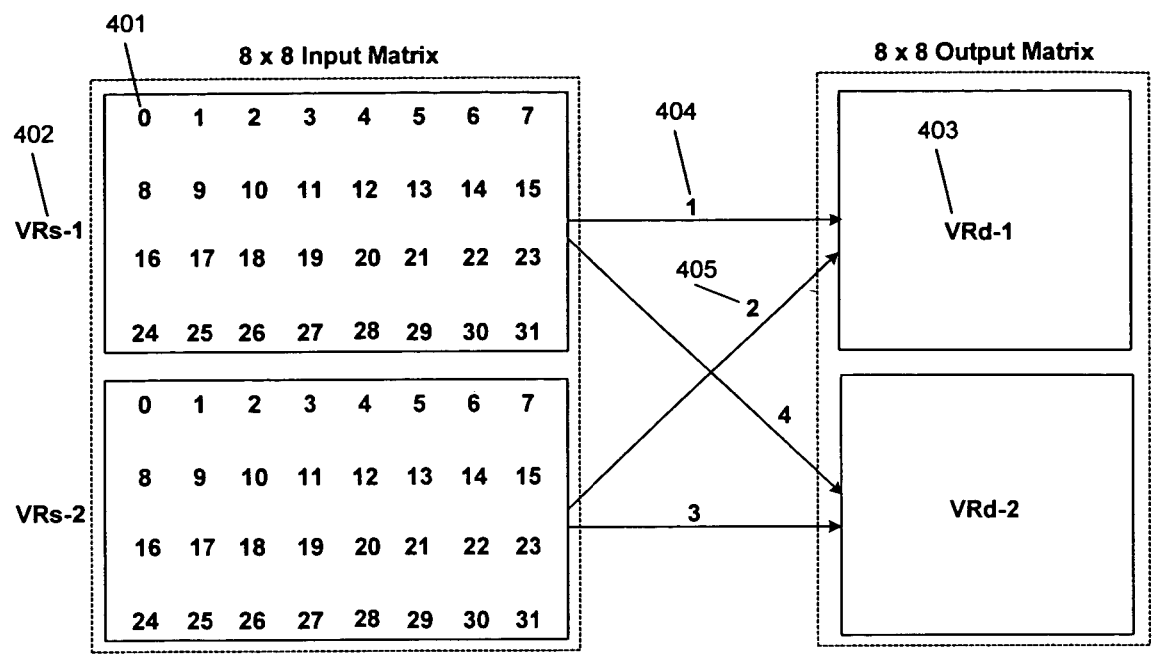
Figure 4. 8x8 Matrix Transpose Example.

FAST AND FLEXIBLE SCAN CONVERSION AND MATRIX TRANSPOSE IN A SIMD PROCESSOR

CROSS REFERENCE TO RELATED APPLICATION

This application claims priority under 35 U.S.C 119(e) from U.S. Provisional Application No. 60/385,648 filed on Jun. 3, 2002 by Tibet Mimar entitled "Method for Fast and Flexible Scan Conversion and Matrix Transpose in a SIMD Processor", the subject matter of which is fully incorporated herein by reference.

BACKGROUND OF THE INVENTION

1. Field of the Invention

The invention relates generally to the field of processor chips and specifically to the field of single-instruction multiple-data (SIMD) processors. More particularly, the present invention relates to loading vector registers in a SIMD processor.

2. Description of the Background Art

Video compression algorithms use a scanning method to convert two-dimensional output of DCT values into one-dimensional values. JPEG, MPEG-1, MPEG-2, MPEG-4, H.263, and H.264 all uses multiple types of scan operation for compression and the inverse for decompression. For example, for video decompression MPEG-4 has three types of inverse scan: Alternate horizontal-scan, alternate vertical scan, and zigzag scan. All of these require different type of mapping of 8-by-8 two-dimensional (2-D) array of element values. The new standard H.264, which is part of MPEG-4 Part 10, also requires scanning mapping for block sizes of 4-by-4 and 2-by-2.

Another common operation for video compression and decompression standards is the matrix transpose operation. Most of video compression and decompression standards require an 8-by-8 Discrete Cosine Transform (DCT) operation and its inverse (IDCT), which is typically implemented as eight one-dimensional (1-D) DCT/IDCT operations, followed by matrix transpose, and followed by another eight 1-D DCT/IDCT operations. The H.264 standard also requires DCT of 4×4 and 2×2 block sizes.

SIMD processors provide a speed advantage by processing N pixel values at the same time. While it is well understood how to use SIMD instructions for data processing such as implementation of FIR filters, it is not obvious how or if SIMD architecture could also be applied for speedup of matrix transpose and scan conversion operations.

The current implementations either use software method with little or no parallelism for implementing scan conversion and matrix transpose, or they use a dedicated hardware block to accelerate these operations. Implementing these instructions in software would require about 128 instructions using load-store model RISC architecture, such as MIPS-4000. The software approach lacks the performance needed to implement the compression and decompression algorithms for resolutions and frame rates required by Digital TV and set-top boxes.

Dedicated hardware transpose units along with SIMD processor have also been used to implement this operation. Dedicated hardware implementation requires different blocks for scan conversion and matrix transpose and lacks the flexibility to support new compression algorithms such as H.264 that require different block sizes.

SUMMARY OF THE INVENTION

The present invention provides an efficient and flexible way to implement scan conversion and matrix-transpose operation in parallel by using one or more general mapping operations for vector register elements, as discussed in co-referenced U.S. patent application Ser. No. 10/357,805, entitled "Flexible Method of Mapping Vector Register Elements". A general mapping of M-by-M matrix for scan conversion and matrix transpose will require $(M*M/N)^2$ SIMD mapping instructions if M*M is larger than N, where each mapping performs N operations in parallel using a single SIMD instruction. If M*M is smaller than N, then each SIMD mapping instruction perform (N/(M*M)) scan conversion or matrix transpose operations. Each SIMD instruction is pipelined and takes one clock cycle to execute. Mapping of each element can be masked, in which case the corresponding output vector element remains unchanged. This is necessary to partition mapping, if number of elements of processor is less than the total number of elements required for mapping.

In one preferred embodiment of present invention using 32 elements per vector registers, we would need four SIMD instructions to implement any scan conversion algorithm or matrix transpose for the commonly used 8-by-8 block size. This provides a very fast, but yet flexible way to implement these operations in a processor. H.264 also requires 4-by-4 and 2-by-2 block sizes, in which case two and eight simultaneous scan conversions or matrix transpose operations could be performed by one SIMD vector multiplex operation, respectively. This represents a factor of N faster implementation using the programmable SIMD architecture. The data that is stored in each vector register is part of a two-dimensional (2-D) array or multiple 2-D arrays to be mapped or scan converted.

BRIEF DESCRIPTION OF THE DRAWINGS

The accompanying drawings, which are incorporated and form a part of this specification, illustrated prior art and embodiments of the invention, and together with the description, serve to explain the principles of the invention.

FIG. 1 illustrates the operation of mapping source vector elements to output vector elements based on a control vector register. This circuit block diagram shows a SIMD processor with N elements per vector register.

FIG. 2 shows the operation of output enable circuit and the details of mask and condition code flags that enable or disable the mapping of each output vector element.

FIG. 3 shows an example of 4×4 scan conversion, as required by H.264 algorithm.

FIG. 4 shows an example case for 8×8 matrix transpose operation. Four SIMD instructions are required for the preferred embodiment of SIMD with 32 elements, because the span of each vector is half of 64 elements to be mapped. Thus, two instructions are required to map each half of output. This example uses two input vector registers, four mapping control vector registers and two output vector registers.

DETAILED DESCRIPTION

FIGS. 1 and 2 illustrate the mapping of vector elements. One embodiment of a SIMD mapping instruction is using a source-vector register (VRs), a mapping control vector register (VRc), and destination vector register (VRd), as follows:

VMUX.CC VRd, VRs, VRc

VMUX is the vector-multiplex instruction, where "CC" specifies the condition codes, if the mapping is to be enabled based on each element's condition code flags. If condition code flags is not to be used, then the condition "True" could be used or ".CC" is simply left out. The use of condition codes is not necessary for scan conversion and matrix transpose.

For an N-element SIMD, it will take log2 (N) bits to specify the mapping for each output element. For example, if there are 32 elements per vector register, then five bits are needed to specify the mapping. This mapping field is part of each element of the control vector register 100. Also, mask bit is specified for each element of the control vector register, which selectively disables mapping for a given element. We could assign the bit fields for mapping and mask bit in multiple ways, but in one embodiment using 16-bit elements and 32 elements per vector, the following is used:

Bits 4 to 0: Mapping Field: Indicates which input element of source vector is mapped to that output element.
Bits: 14 to 5: Unused.
Bit 15: Mask: When set to one, this bit disables the writeback of mapping output element into the register file for a given element.

The mapping value for each element controls the corresponding selector 120, which selects the specified source element from source vector register 110. Mask bit for a given element will disable the write-back stage of the instruction pipeline for that element, when set to one. The output enable logic 130 is not only controlled by mask bit 220 but a logical AND 200 of mask bit and selected combination of condition code flags 210 for that element position. If the logical result of this AND is false, the writing of mapping for that output element is disabled, and output element 140 remains unchanged. This masking capability is useful for conditional or unconditional merging of multiple vector register elements without requiring any flow control instructions. The switch 200 to enable or disable a given output element mapping is controlled by a combination of mask bit condition codes.

Condition codes are not used for the scan conversion and matrix transpose cases. This is same as specifying "True" for condition codes, or not specifying them at all in the instruction. This means that no output element is disabled based on condition codes, but only based on mask bits.

Scan Conversion

Scan conversion is typically used to change a two-dimensional (2-D) sequence to a one-dimensional (1-D) sequence, or back. The most typical one is zigzag conversion sequence that is used after Discrete-Cosine Transform (DCT) output values for an 8×8 2-D block is quantized. There are different types of zigzag scan used by all MPEG and H.26x video compression algorithms. The decompression algorithms perform the opposite, i.e., inverse zig-zag scan. H.264 and MPEG-4 Part 10 also requires scan conversion for block sizes such as 4×4.

Example 4×4 scan conversion is shown in FIG. 3. The input 4×4 block is mapped to output block using zigzag mapping. The zigzag scan arranges the coefficient in an ascending order of the corresponding frequencies. 301 shows the sequence of mapping, and 302 shows how row-sequential 4×4 block indices are mapped in this case. When SIMD has 32 elements, i.e., N equals 32; it could perform two 4×4 block conversions in one SIMD instruction. Assuming two 4×4 blocks are stored in one vector register in row-sequential form, we would map the indices of between the input and output vector registers as follows:

| Original 4 × 4 Array - Vector Register Index | Mapped 4 × 4 Vector Register Index |
|---|---|
| 0 | 0 |
| 1 | 1 |
| 4 | 2 |
| 8 | 3 |
| 5 | 4 |
| 2 | 5 |
| 3 | 6 |
| 6 | 7 |
| 9 | 8 |
| 12 | 9 |
| 13 | 10 |
| 10 | 11 |
| 7 | 12 |
| 11 | 13 |
| 14 | 14 |
| 15 | 15 |
| 16 | 16 |
| 17 | 17 |
| 20 | 18 |
| 24 | 19 |
| 21 | 20 |
| 18 | 21 |
| 19 | 22 |
| 22 | 23 |
| 25 | 24 |
| 28 | 25 |
| 29 | 26 |
| 26 | 27 |
| 23 | 28 |
| 27 | 29 |
| 30 | 30 |
| 31 | 31 |

After the first 16, the mapping pattern repeats, but this time with an offset of 16 added.

The mapping requires a control vector 304, which contains the mapping required. Each VRc element contains a value that specifies which input element for that given element position is mapped from. Two input blocks are loaded into source vector register VRs 305, using a vector load instruction(s). VMUX instruction 303 performs two 4×4 block conversions in one instruction.

For example, element zero of VRc contains zero, which means element zero of VRs is mapped to element zero of VRd. Element two of VRc contains four, which means element two of VRd comes from element four of VRs, and so forth. The mapping pattern is repeated twice since two blocks are mapped by each instruction for this particular example.

Transposing an 8×8 block will require four instructions, and this is similar to the 8×8 matrix transpose that is described next. If there are 64 elements, i.e., if N equals 64 elements, then a single instruction will do the scan conversion in a single step.

Matrix Transpose

Almost all video compression and decompression algorithms commonly use the 8×8 matrix transpose or its inverse. Transposing an 8×8 block with the present invention requires four VMUX instructions if number of vector elements equal 32, as illustrated in FIG. 4. The top half of input matrix is loaded into source vector register VRs-1 402, and bottom 4 rows is stored into a second vector source register VRs-2. The numbers shown 401 specify the element number of the vector register containing that input value for that position of the 8×8 matrix. The transpose operation takes four instructions for the case when there are 32 elements in a SIMD processor. The transposed output is stored in two output vector registers. The top 4 rows of output is stored in VR-d1 vector register 403, and bottom half is stored in vector register VRd-2. Mapping each half of output takes two instructions, because in general each output value could come from either half of the input, and since each multiplex instructions spans only one half of input matrix, we would need two instructions and use the masking ability to merge two mappings into one. The instructions for the matrix transpose operation are shown below, where the number of instruction corresponds to the numbers shown 405 on the figure:

| 1. VMUX | VRd-1, VRs-1, VRc-1 |
| 2. VMUX | VRd-1, VRs-2, VRc-2 |
| 3. VMUX | VRd-2, VRs-1, VRc-3 |
| 4. VMUX | VRd-2, VRs-2, VRc-4 |

Where:
VRc-1={0, 8, 16, 24, M, M, M, M, 1, 9, 17, 25, M, M, M, M,
2, 10, 18, 26, M, M, M, M, 3, 11, 19, 27, M, M, M, M}
VRc-2={M, M, M, M, 0, 8, 16, 24, M, M, M, M, 1, 8, 17, 25,
M, M, M, M, 2, 10, 18, 26, M, M, M, M, 3, 11, 19, 27}
VRc-3={4, 12, 20, 28, M, M, M, M, 5, 13, 21, 29, M, M, M, M,
6, 14, 22, 30, M, M, M, M, 7, 15, 23, 31, M, M, M, M}
VRc-4={M, M, M, M, 4, 12, 20, 28, M, M, M, M, 5, 13, 21, 29,
M, M, M, M, 6, 14, 22, 30, M, M, M, M, 7, 15, 23, 31} and M=0×8000 indicates masking mapping, i.e., output remains unchanged.

PREFERRED EMBODIMENT

The preferred embodiment uses a vector array processor as tightly coupled to a RISC processor, whereby one SIMD and one RISC instruction is executed every clock cycle as a dual-issue combined processor. The vector/array SIMD processor has a vector/array register file, which is loaded or stored using RISC processor instructions. There is no flow control in the SIMD processor, and the RISC processor handles all program flow control. The present invention could be easily scaled for different number of vector elements, but let us assume 32 elements for the preferred embodiment, where each element is 16-bits wide. Thus, the vector registers and the data memory to load them are 512 bits wide. VR1 to VR32 are the vector registers that may contain vector or 2-D array values.

Scan conversion of two 4×4 blocks used in H.264 could be implemented by a single vector instruction. Assuming VR3 contains the mapping vector, and VR2 contains the two 4×4 blocks to be reordered, the following SIMD instruction have the result of two reordered 4×4 blocks stored in vector register VR1.

VMUX VR1, VR2, VR3 //VR1→VR2 mapped by VR3

The program below shows the 8×8 matrix transpose that was discussed earlier. "EA" indicates Effective-Address specification of where these source vector operands are stored in data memory. LDV is the vector load instruction that loads all elements of a vector register with elements from data memory pointed by EA.

```
//Load Mapping Vectors as part of initialization
LDV   VR1, <EA>
LDV   VR2, <EA>
LDV   VR3, <EA>
LDV   VR4, <EA>
//Load and Transpose Two 8×8 Blocks
LDV   VR5, <EA>;                              //VR5 = Top 4 rows
LDV   VR6, <EA>;                              //VR6 = Bottom 4 rows
NOP;                                          //Wait for load of VR5
              VMUXVR7, VR5, VR1               //Transpose 1st Block
LDV   VR5, <EA>;  VMUXVR7, VR6, VR2
LDV   VR6, <EA>;  VMUXVR8, VR5, VR3
              VMUXVR8, VR6, VR4
              VMUXVR9, VR5, VR1               //Transpose 2nd Block
              VMUXVR9, VR6, VR2
              VMUXVR10, VR5, VR3
              VMUXVR10, VR6, VR4
```

There are two instructions per line, one RISC and one SIMD instruction. The SIMD instructions start with "V" such as VMUX (Vector Multiplex) instruction. The instruction pipeline is exposed, which means loading of any vector registers will take affect in a fixed number of instructions. We assumed two in this case. The loaded register is guaranteed not to change before then. We had to use a No-Operation (NOP) instruction after loading VR5 and VR6 the first time to wait for two instruction delay to load the vector registers.

I claim:
1. A processing core for executing instructions comprising:
   A) a RISC processor core for performing scalar operations and program flow control; and
   B) a SIMD processor core for performing vector operations comprising:
      a) a set of vector registers wherein each vector register comprises N elements wherein the N elements comprising parts of one-dimensional vector and a two-dimensional array and said set of vector registers are grouped together and are operably coupled to a plurality of read ports and plurality of write ports for accessing said set of vector registers at substantially the same time; and
      b) a plurality of select logic circuits, each having a select control input and N data inputs, for any mapping of one of N vector elements of an input vector to N elements of an output vector; and
      c) data inputs of said select logic circuits being coupled to one of plurality of said read ports vector register file; and
      d) select control inputs of said select logic circuit being coupled to one of said plurality of read ports of vector register file; and
      e) Means for writing the output of said select logic to a vector register file; and
      f) Means for masking the output of selected vector elements, whereby masked elements of said vector register file remain unchanged; and
   C) a data memory N elements wide, wherein said memory array stores at least one of video, graphics data, constants, LUT contents and a user mapping of said input vector to said output vector; and
   D) the RISC processor core is coupled to said data memory for performing data input and output opera- tions for both the RISC processor core and the SIMD processor core, whereby zig-zag mapping of a two-dimensional input array of M-by-M elements to an M-by-M output elements with a user-defined mapping is performed;

whereby matrix transpose of a two-dimensional input array of M-by-M elements to an M-by-M output is performed.

2. Apparatus of claim 1 wherein zig-zag mapping of a two-dimensional input array of M-by-M elements to an M-by-M output elements with a user-defined mapping is performed, where:

a. One or more vector registers of a processor register file is used to store input M-by-M array of elements;

b. One or more vector registers of a processor register file are used to define the mapping for scan conversion and also to disable mapping to certain output elements;

c. One or more vector registers of a processor register file are used to store the zig-zag output mapped M-by-M values;

d. One or more processor instructions that execute the mapping of input vector register or vector registers to output vector register or registers to perform user-defined zig-zag mapping.

3. Apparatus of claim 2 wherein matrix transpose of a two-dimensional input array of M-by-M elements to an M-by-M output, where:

a. One or more vector registers of a processor register file is used to store input M-by-M array of elements;

b. One or more vector registers of a processor register file are used to define the matrix transpose mapping, and also to disable mapping to certain output elements;

c. One or more vector registers of a processor register file are used to store the matrix-transposed output mapped M-by-M values;

d. One or more processor instructions that execute the mapping of input vector register or vector registers to output vector register or registers to perform matrix transpose.

4. The apparatus of claim 3, wherein the value of N is selected from a group of values consisting of integer values between 4 and 256.

5. The apparatus of claim 4, wherein the value of M is selected from a group of values consisting of {2, 4, 8, 16, 32, 64, 128, 256}.

6. The apparatus of claim 5, wherein each vector element is a byte.

7. The apparatus of claim 5, wherein each vector element is a 16-bit fixed-point word.

8. The apparatus of claim 5, wherein each vector element is a 32-bit fixed point word.

9. The apparatus of claim 5, wherein each vector element is a floating-point value.

* * * * *